US012496703B2

(12) United States Patent
Hyodo

(10) Patent No.: US 12,496,703 B2

(45) Date of Patent: Dec. 16, 2025

(54) ELECTRIC TOOL

(71) Applicant: MAXELL IZUMI CO., LTD., Matsumoto (JP)

(72) Inventor: Keita Hyodo, Matsumoto (JP)

(73) Assignee: MAXELL IZUMI CO., LTD., Matsumoto (JP)

( * ) Notice: Subject to any disclaimer, the term of this patent is extended or adjusted under 35 U.S.C. 154(b) by 371 days.

(21) Appl. No.: 18/276,555

(22) PCT Filed: May 18, 2022

(86) PCT No.: PCT/JP2022/020677

§ 371 (c)(1),
(2) Date: Aug. 9, 2023

(87) PCT Pub. No.: WO2022/249950

PCT Pub. Date: Dec. 1, 2022

(65) Prior Publication Data

US 2024/0100686 A1 Mar. 28, 2024

(30) Foreign Application Priority Data

May 27, 2021 (JP) ................................ 2021-089372

(51) Int. Cl.

*B25B 27/00* (2006.01)
*B25H 7/00* (2006.01)
*E04G 21/18* (2006.01)

(52) U.S. Cl.

CPC .......... *B25H 7/00* (2013.01); *E04G 21/1841* (2013.01)

(58) Field of Classification Search

CPC ... B23Q 5/06; B23Q 5/142; B23Q 5/12; B21J 15/18; B21J 15/20; B25B 27/02; B25B 27/14

See application file for complete search history.

(56) References Cited

U.S. PATENT DOCUMENTS 3,616,673 A * 11/1971 Miklos .................. B21J 15/105
72/453.17
6,886,226 B1 * 5/2005 Dear ....................... B21J 15/26
227/55

(Continued)

FOREIGN PATENT DOCUMENTS

JP S52-010285 B2 3/1977
JP S54-92030 U 6/1979

(Continued)

OTHER PUBLICATIONS

PCT/ISA/210, "International Search Report for PCT International Application No. PCT/JP2022/020677," Jun. 28, 2022.

*Primary Examiner* — Lee D Wilson

(74) *Attorney, Agent, or Firm* — HAUPTMAN HAM, LLP

(57) ABSTRACT

This electric tool provides superior workability even at outdoor locations, high places, etc., and has a compact and easy-to-use structure. The electric tool includes: a chuck which grips a bolt hole positioning pin; a cylinder part which has provided thereto a piston that draws the chuck and pulls in the bolt hole positioning pin; a body which has provided thereto a hydraulic pump that delivers hydraulic oil to the cylinder part and a motor that drives the hydraulic pump; a connection part which connects the cylinder part and the body and through which the hydraulic oil is passed; and a secondary battery which supplies electricity to the motor.

17 Claims, 8 Drawing Sheets

(56) References Cited

U.S. PATENT DOCUMENTS

| | | | | |
|---|---|---|---|---|
| 11,724,304 | B2 * | 8/2023 | Olsson | B21J 15/18<br>29/243.523 |
| 2012/0198678 | A1 * | 8/2012 | Lehnert | B25B 27/026<br>29/426.5 |
| 2020/0180092 | A1 * | 6/2020 | Ruch | B21D 55/00 |
| 2023/0120099 | A1 * | 4/2023 | LeFavour, Jr. | B25B 27/10<br>173/216 |
| 2023/0234206 | A1 * | 7/2023 | Yamanaka | B25B 23/147<br>173/46 |
| 2024/0001518 | A1 * | 1/2024 | Albrecht | B25B 23/0035 |
| 2024/0100686 | A1 * | 3/2024 | Hyodo | B25F 5/02 |
| 2024/0278393 | A1 * | 8/2024 | Rusch | B25B 21/026 |

FOREIGN PATENT DOCUMENTS

| | | | |
|---|---|---|---|
| JP | S61-105590 | U | 7/1986 |
| JP | 2001-113471 | A | 4/2001 |

* cited by examiner

ELECTRIC TOOL

RELATED APPLICATIONS

The present application is National Phase of International Application No. PCT/JP2022/020677 filed May 18, 2022, and claims priority from Japanese Application No. 2021-089372, filed May 27, 2021, the disclosures of which are hereby incorporated by reference herein in its entirety.

TECHNICAL FIELD

The present invention relates to an electric tool used for aligning a bolt hole.

BACKGROUND ART

In the related art, there is known a device for pulling and correcting a bolt hole alignment pin by using a hydraulic pressure when structural metal members are combined (PTL 1: JP-B-552-10285).

CITATION LIST

Patent Literature

PTL 1: JP-B-552-10285

SUMMARY OF INVENTION

Technical Problem

In the device disclosed in PTL 1, a hydraulic pump and a cylinder part are joined by a hydraulic hose. Consequently, a total weight of the device increases, thereby causing degraded portability. In addition, when metal members such as structural steel frames are combined outdoors, a generator is required when the device is operated in a place where there is no commercial power supply. Even when there is a commercial power supply, a power cord is required. Therefore, an operation range is limited. In addition, as an example, quietness is required when scaffolding is set up in a city center, and an operation sound of the generator generates noise.

Solution to Problem

The present invention is made in view of the above-described circumstances, and aims to provide an electric tool used for aligning a bolt hole, which has excellent operability even outdoors or even at a high place, and has a more compact and user-friendly structure than an electric tool in the related art.

The present invention has been accomplished under the solutions as disclosed below.

According to the present invention, there is provided an electric tool including a cylinder part in which a chuck for gripping a bolt hole alignment pin and a piston for drawing the bolt hole alignment pin by pulling the chuck are disposed, a main body in which a hydraulic pump for feeding hydraulic oil for operating the piston to the cylinder part and an electric motor for driving the hydraulic pump are disposed, a connecting part for connecting the cylinder part and the main body to cause the hydraulic oil to pass, and a secondary battery for supplying electric power to the electric motor.

According to this configuration, the secondary battery provided in the electric tool supplies the electric power to the electric motor, the electric motor drives the hydraulic pump, the hydraulic pump feeds the hydraulic oil to the cylinder part through the connecting part, and the cylinder part draws the bolt hole alignment pin by pulling the chuck. Therefore, a power cord and a hydraulic hose are no longer required, and an operation range can be enlarged. Therefore, a compact and user-friendly structure can be achieved.

It is preferable that a first hydraulic line and a second hydraulic line through which the hydraulic oil passes are formed in the connecting part, the first hydraulic line is joined to the main body at a first joint, the second hydraulic line is joined to the cylinder part at a second joint, and the first hydraulic line and the second hydraulic line are joined to each other at a hydraulic line joint. According to this configuration, a pump chamber in the main body and a piston chamber in the cylinder part can be connected by using a shortest route. Therefore, liquid feeding efficiency can be further improved.

It is preferable that the connecting part and the main body are connected to each other to be pivotable around a first axis passing through the first joint. According to this configuration, positions of the main body and the cylinder part can be changed via the connecting part, and a relative angle between the main body and the cylinder part can be adjusted in accordance with a position or a direction of an alignment pin. Therefore, operability is further improved.

It is preferable that the connecting part and the cylinder part are connected to each other to be pivotable around a second axis passing through the second joint, and the electric tool further includes a clamp part that aligns the cylinder part and the connecting part by restricting pivoting of the cylinder part and the connecting part. According to this configuration, while loosening of the cylinder part and the connecting part can be prevented by locking the clamp part, the cylinder part can pivot around the second axis by causing the clamp part to unlock the cylinder part. Therefore, operation safety can be further improved. As an example, the clamp part can lock pivoting of the cylinder part at a specified angle such as 90 degrees or 45 degrees. As an example, the clamp part has a recess portion fitted to a projection portion of the cylinder part, has an incorporated spring for maintaining a locked state, and is provided with a thumbscrew for releasing the locked state against a biasing force of the spring. In this manner, a locking operation and an unlocking operation of the clamp part can be easily performed with one hand.

The first axis and the second axis are in a relationship of being perpendicular to each other or in a relationship of intersecting each other. Therefore, a relative position between the cylinder part and the main body can be more freely adjusted by combining the pivoting at the first joint and the pivoting at the second joint. Therefore, the operability is further improved. As an example, the connecting part is connected to be pivotable around the first axis passing through the first joint, and the connecting part is connected to the cylinder part to be pivotable around the second axis passing through the second joint. In this manner, the relative angle between the main body and the cylinder part can be freely adjusted by using two axes. Therefore, the relative angle between the main body and the cylinder part can be adjusted over a wider range in accordance with the position or the direction of the alignment pin. Therefore, the operability is further improved. As an example, the cylinder part is connected to the connecting part to be pivotable around the second axis perpendicular to the axis of the piston and passing through the second hydraulic line. In this manner, a length of the second hydraulic line in a liquid feeding route can be shortened as much as possible, and a force required for the pivoting can be reduced. As an example, the main body is connected to the connecting part to be pivotable around the first axis parallel to the axis of the piston and passing through the first hydraulic line. In this manner, the length of the first hydraulic line in the liquid feeding route can be shortened as much as possible, and the force required for the pivoting can be reduced. As an example, in some cases, the cylinder part may be configured so that the piston moves rearward to protrude from a rear end outlet. In this manner, a size and a weight of the cylinder part can be reduced. As an example, in some cases, the cylinder part may not protrude from the rear end outlet even when the piston moves rearward. In this manner, operation safety can be further improved.

As an example, the cylinder part is provided with a first handle disposed in a direction separated from the main body. According to this configuration, while the size and the weight of the cylinder part can be reduced, the operation can be performed by holding the first handle. Therefore, operation safety can be further improved. In addition, when an operation time is lengthened outdoors or at a high place, the operation time can be extended by replacing the battery pack adopting the secondary battery such as a lithium-ion battery and a nickel-metal hydride battery. The battery pack can be shared with other electric tools, and can cope with a single charger. Therefore, a rational configuration suitable for an operation site can be adopted.

As an example, the cylinder part is provided with a hanging metal fitting disposed at a predetermined position in a direction opposite to the connecting part. According to this configuration, when an operation is performed by attaching a fall prevention rope to the hanging metal fitting, the center of gravity is satisfactorily balanced when the fall prevention rope is hung. Therefore, a configuration can be adopted in view of safety in an operation outdoors or at a high place.

Advantageous Effects of Invention

According to the present invention, it is possible to realize an electric tool used for aligning a bolt hole, which has excellent operability even outdoors or even at a high place, and has a more compact and user-friendly structure than an electric tool in the related art.

DESCRIPTION OF EMBODIMENTS

Figure 1:
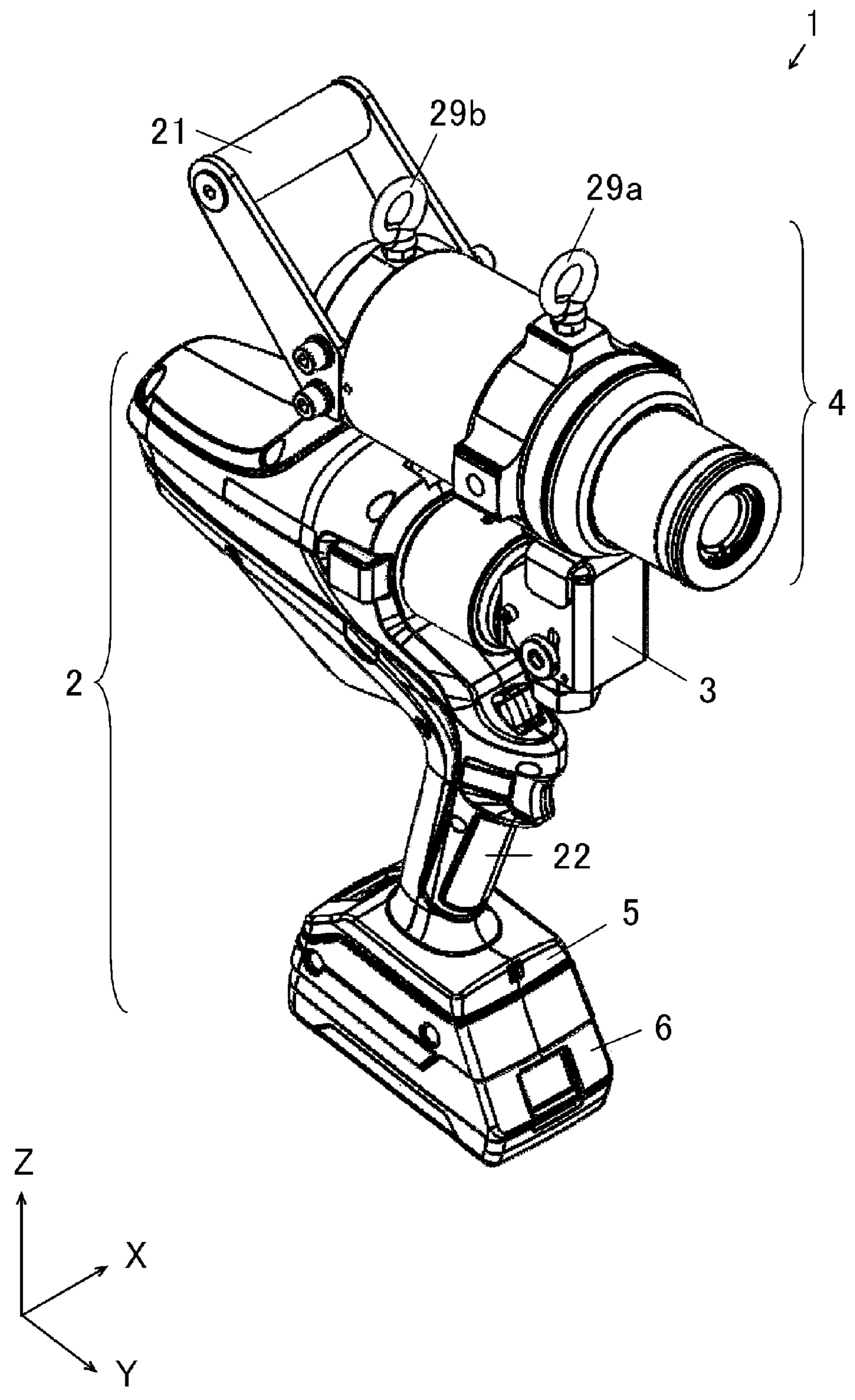
FIG. 1 is a schematic perspective view illustrating an example of an electric tool according to an embodiment of the present invention.

Hereinafter, an embodiment according to the present invention will be described in detail with reference to the drawings. The present embodiment provides an electric tool that pulls a bolt hole alignment pin by using a hydraulic pressure when metal members such as bridges, scaffoldings, building structures, and other known structural steel frames are combined by using a bolt and a nut. In all drawings for describing the embodiment, the same reference numerals will be assigned to members having the same function, and repeated description thereof may be omitted in some cases.

Figure 2:
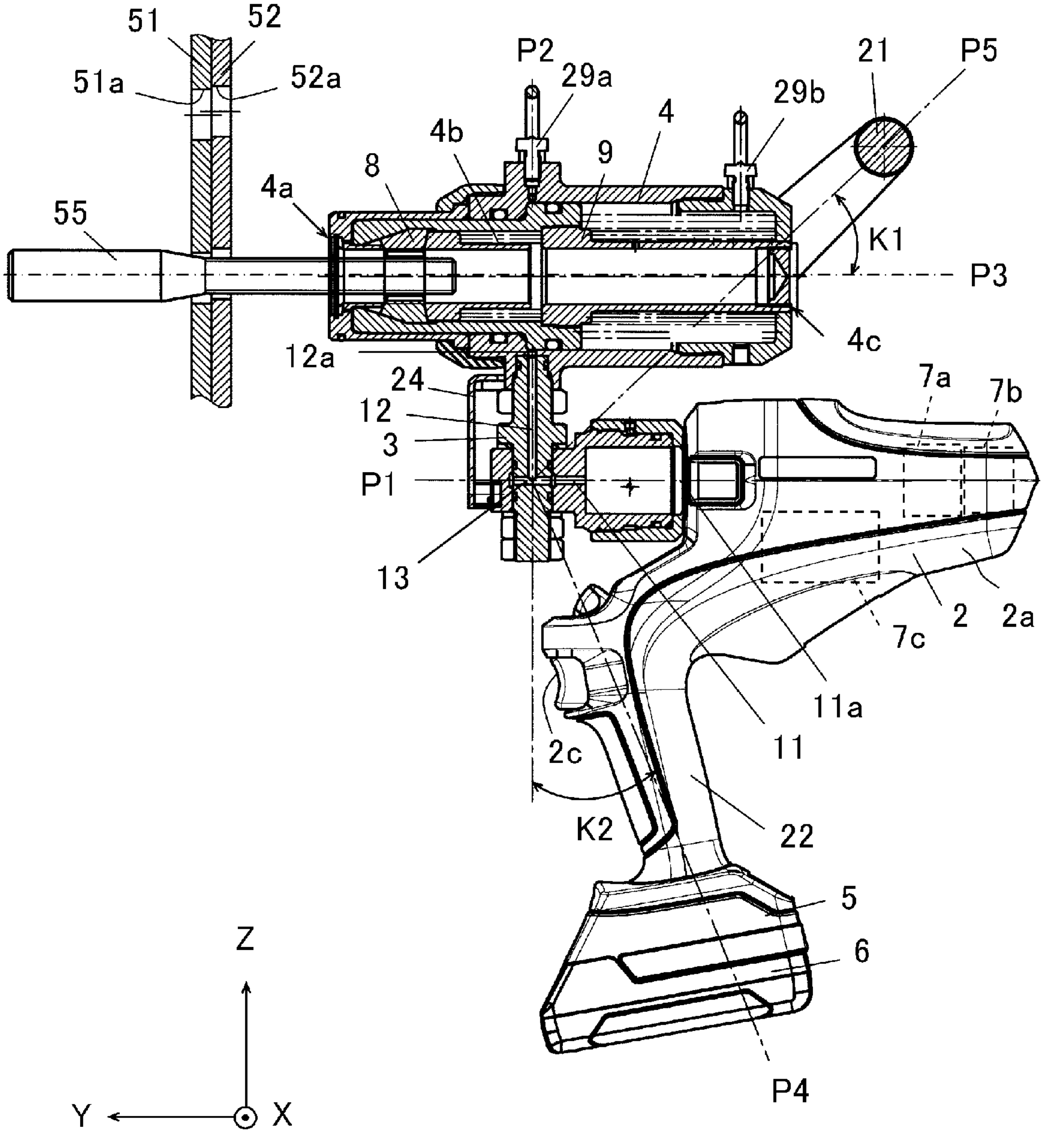
FIG. 2 is a schematic partial sectional view illustrating a state immediately before an alignment pin is gripped in a usage mode of the electric tool of the present embodiment.
Figure 3:
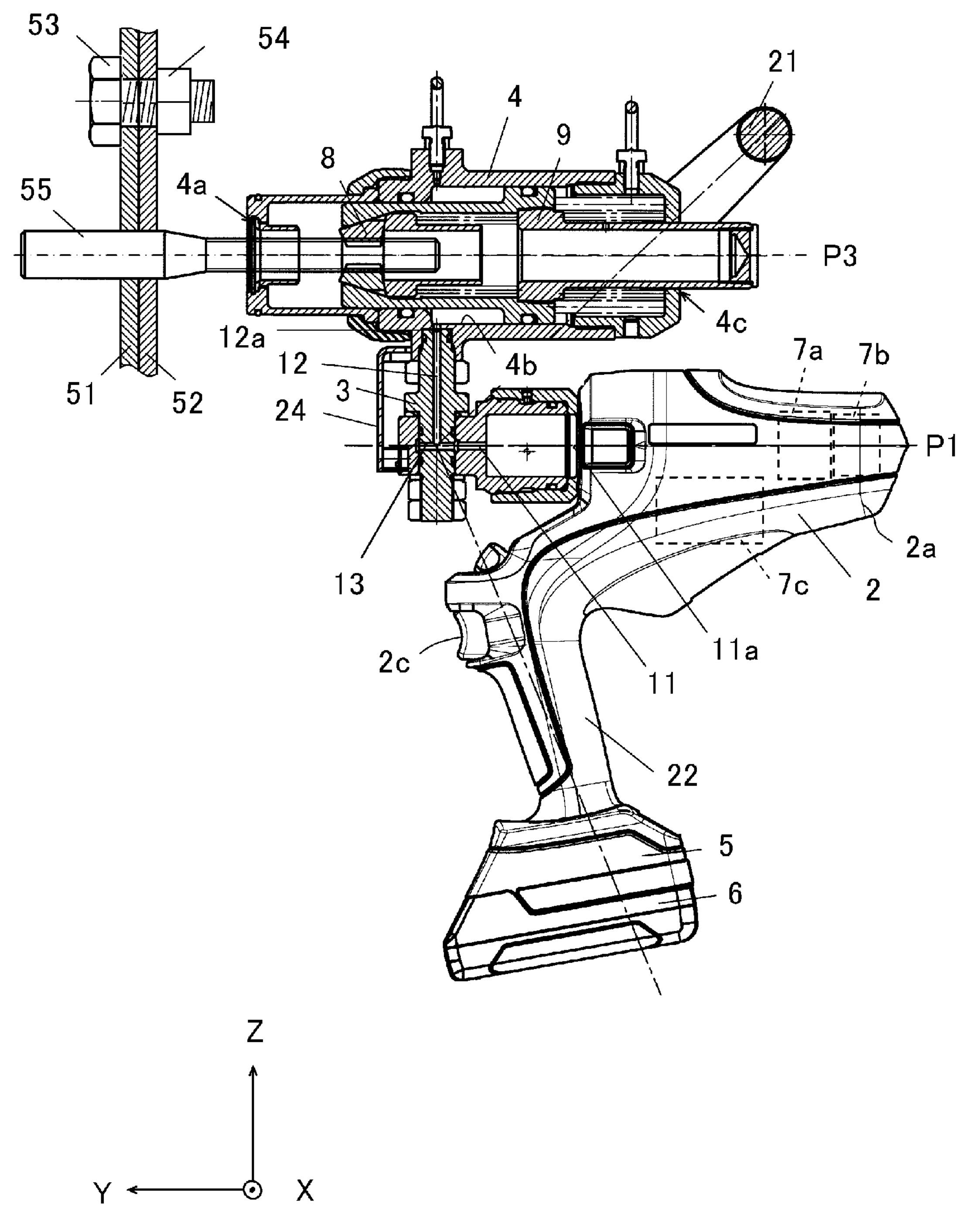
FIG. 3 is a schematic partial sectional view illustrating a state where the alignment pin is gripped and pulled in a usage mode of the electric tool of the present embodiment.

FIGS. 1 to 3 are schematic views illustrating an example of an electric tool 1 according to the present embodiment. The electric tool 1 adopts a configuration in which a cylinder part 4 provided with a first handle 21 and a main body 2 provided with a second handle 22 are connected by a connecting part 3, and is a cordless-type tool held and used by a hand of an operator at a jobsite. Here, in order to facilitate description of a positional relationship of each part of the electric tool 1, directions are indicated by arrows X, Y, and Z in the drawing. A piston 9 reciprocates along a third axis P3. That is, the piston 9 moves forward to a side of an arrow in a Y-direction in the drawing, and moves rearward to a side opposite to the arrow in the Y-direction in the drawing.

As illustrated in FIGS. 2 and 3, a bolt hole alignment pin 55 is a metal rod-shaped member whose center has a tapered shape and in which an outer diameter in a tip portion is set to be smaller than an outer diameter in a rear end portion, and a male screw is formed on a tip side. A metal member 51 such as a structural steel frame has bolt holes 51*a* at a plurality of locations, and a metal member 52 such as a structural steel frame has bolt holes 52*a* at a plurality of locations. Both the metal member 51 and the metal member 52 are large in size. Therefore, due to a thermal expansion degree difference caused by a temperature difference or influence of machining accuracy, the bolt hole 51*a* and the bolt hole 52*a* are misaligned as illustrated in FIG. 2. Therefore, the bolt hole alignment pins 55 are inserted into several locations (two to four locations) of the bolt hole 51*a* and the bolt hole 52*a* at a predetermined interval.

Next, as illustrated in FIG. 3, positions of the bolt hole 51*a* and the bolt hole 52*a* are corrected by causing the electric tool 1 to pull the tip side of the bolt hole alignment pin 55 to a nearer side while causing the electric tool 1 to grip the tip side of the bolt hole alignment pin 55. Thereafter, the bolt hole 51*a* and the bolt hole 52*a* which are located at desired positions by the correction are fastened with a bolt 53 and a nut 54. Then, in accordance with a progress state of a fastening operation, the bolt hole alignment pin 55 is further pulled and drawn by the electric tool 1. After the bolt hole alignment pin 55 is drawn, the bolt hole 51*a* and the bolt hole 52*a* which are located at desired positions by the correction are fastened with the bolt 53 and the nut 54. The bolt hole 51*a* and the bolt hole 52*a* are additionally fastened in a state where the bolt 53 and the nut 54 are arranged in all of the bolt hole 51*a* and the bolt hole 52*a*.

Figure 7A:
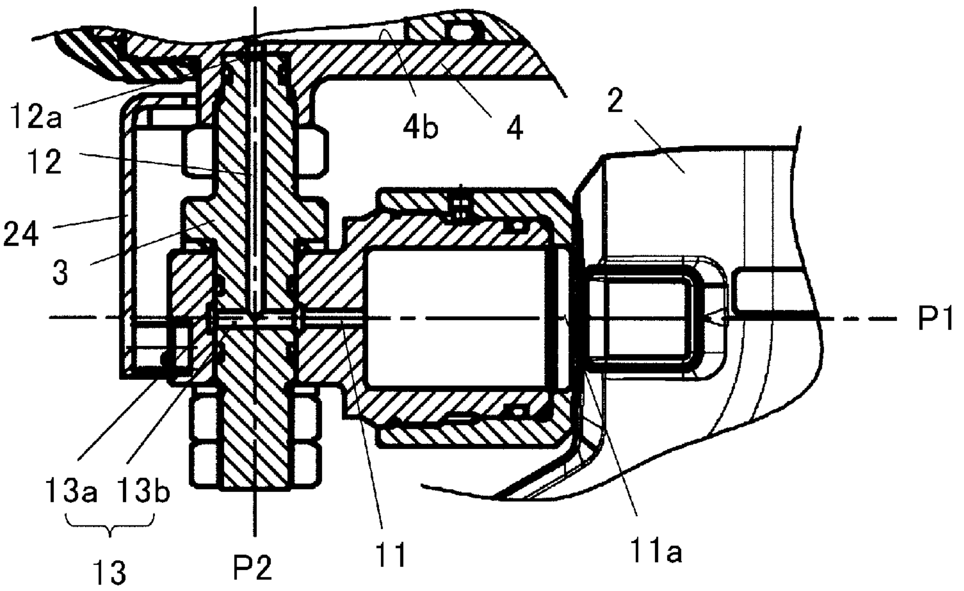
FIG. 7A is a partial sectional view illustrating an example of a connecting part according to the present embodiment.
Figure 7B:
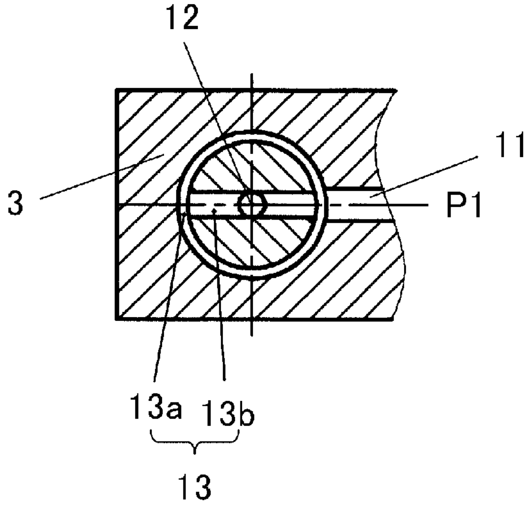
FIG. 7B is a cross-sectional view of a hydraulic line joint in FIG. 7A.

FIG. 7A is a partial sectional view illustrating an example of the movable connecting part 3. FIG. 7B is a sectional view when a hydraulic line joint 13 is viewed in a direction of an arrow in a Z-direction on a first axis P1 passing through a first hydraulic line 11 and the hydraulic line joint 13. As illustrated in FIGS. 7A and 7B, the connecting part 3 has the first hydraulic line 11 for feeding the hydraulic oil, a second hydraulic line 12 joined to the first hydraulic line 11 via the hydraulic line joint 13, and the hydraulic line joint 13 joining the first hydraulic line 11 and the second hydraulic line 12. As an example, the hydraulic line joint 13 includes an annular first flow channel 13*a* and a second flow channel 13*b* linearly connecting the first flow channel 13*a* in a forward-rearward direction. The first hydraulic line 11 is joined to the first flow channel 13*a*, and the second hydraulic line 12 is joined to the second flow channel 13*b*. In addition, the connecting part 3 and the main body 2 are connected by a first joint 11*a*, and the connecting part 3 and the cylinder part 4 are connected by a second joint 12*a*. The first hydraulic line 11 has a large diameter on a primary side close to a hydraulic pump 7*a*, and a small diameter on a secondary side close to the hydraulic line joint 13. In this manner, the hydraulic oil can be fed by efficiently raising the hydraulic pressure of the hydraulic oil.

The main body 2 has a housing 2*a* made of metal or having a configuration in which the metal and a resin are combined. The hydraulic pump 7*a* that feeds the hydraulic oil to a piston chamber 4*b* of the cylinder part 4, an electric motor 7*b* that drives the hydraulic pump 7*a*, and a control circuit 7*c* that controls the electric motor 7*b* are incorporated in the main body 2. The electric motor 7*b* and the control circuit 7*c* are operated by electric power supplied from a secondary battery 6. The battery pack including the secondary battery 6 is detachably joined to an adapter 5 directly connected to the second handle 22 of the main body 2. As an example, the secondary battery 6 is attached to the adapter 5 by a known attachment structure such as slide fitting in a state of the battery pack. As the secondary battery 6, a lithium-ion battery or a nickel-metal hydride battery can be adopted.

The cylinder part 4 accommodates a metal collet-type chuck 8 for gripping the bolt hole alignment pin 55 and the piston 9 for pulling the chuck 8. Slits are formed at three locations or four locations in the chuck 8 in an axial direction, and a female screw corresponding to a male screw of the bolt hole alignment pin 55 is formed on an inner peripheral side of each claw portion in the collet. In a bolt hole alignment operation, as illustrated in FIG. 2, the bolt hole alignment pin 55 is inserted into an inlet 4*a* of the cylinder part 4. Then, a button of a start switch 2*c* disposed in an upper intermediate portion of the first handle 21 is pushed, the electric motor 7*b* is operated under the control of the control circuit 7*c*, and the hydraulic oil is fed to the piston chamber 4*b* from the hydraulic pump 7*a* connected to the electric motor 7*b*. When the hydraulic oil is fed to the piston chamber 4*b*, as illustrated in FIG. 3, the piston 9 moves so that a part of the piston 9 protrudes from an outlet 4*c* of the cylinder part 4, and pulls a tip portion of the chuck 8 rearward while fastening the tip portion of the chuck 8.

The cylinder part 4 is provided with the first handle 21 inclined in a direction separated from the main body 2 with respect to the third axis P3 passing through the chuck 8 and the piston 9. The second handle 22 having a grip shape forms a part of the housing 2*a*, and the adapter 5 is joined thereto. The second handle 22 is inclined to be separated from the connecting part 3 toward a side joined to the adapter 5. In the first handle 21 having a roller-shaped gripping portion, each arm for supporting the gripping portion is fixed to both sides of a rear outer surface of the cylinder part 4, and the first handle 21 is inclined so that the gripping portion side is separated from the main body 2 while leaving a position of the outlet 4*c* from which the piston 9 protrudes.

The first axis P1 passes through the first hydraulic line 11, the first joint 11*a*, the hydraulic pump 7*a*, and the electric motor 7*b*. A second axis P2 passes through the second hydraulic line 12, the second joint 12*a*, and the piston chamber 4*b*. The third axis P3 passes through the chuck 8 and the piston 9. As an example, the first hydraulic line 11 and the second hydraulic line 12 are orthogonal to each other. At least the first hydraulic line 11 and the second hydraulic line 12 intersect each other. As an example, the first axis P1 and the second axis P2 are orthogonal to each other. At least the first axis P1 and the second axis P2 intersect each other. As an example, the first axis P1 and the third axis P3 are parallel to each other. A fourth axis P4 passes through the center of the gripping portion of the second handle 22 and the hydraulic line joint 13. The fourth axis P4 intersects all of the first axis P1, the second axis P2, the third axis P3, and a fifth axis P5. In addition, the fifth axis P5 passes through the center of the gripping portion of the first handle 21 and the hydraulic line joint 13. The fifth axis P5 intersects all of the first axis P1, the second axis P2, the third axis P3, and the fourth axis P4.

The gripping portion in the first handle 21 and the gripping portion in the second handle 22 are respectively inclined and arranged to be separated rearward from each other in a direction opposite to an arrow in the Y-direction. As illustrated in FIG. 2, as an example, an angle K2 at which the second axis P2 and the fourth axis P4 intersect each other is set to 30 degrees or larger and 60 degrees or smaller. In addition, as an example, an angle K1 at which the third axis P3 and the fifth axis P5 intersect each other is set to 30 degrees or larger and 60 degrees or smaller.

Figures 4A, 4B, 4C:
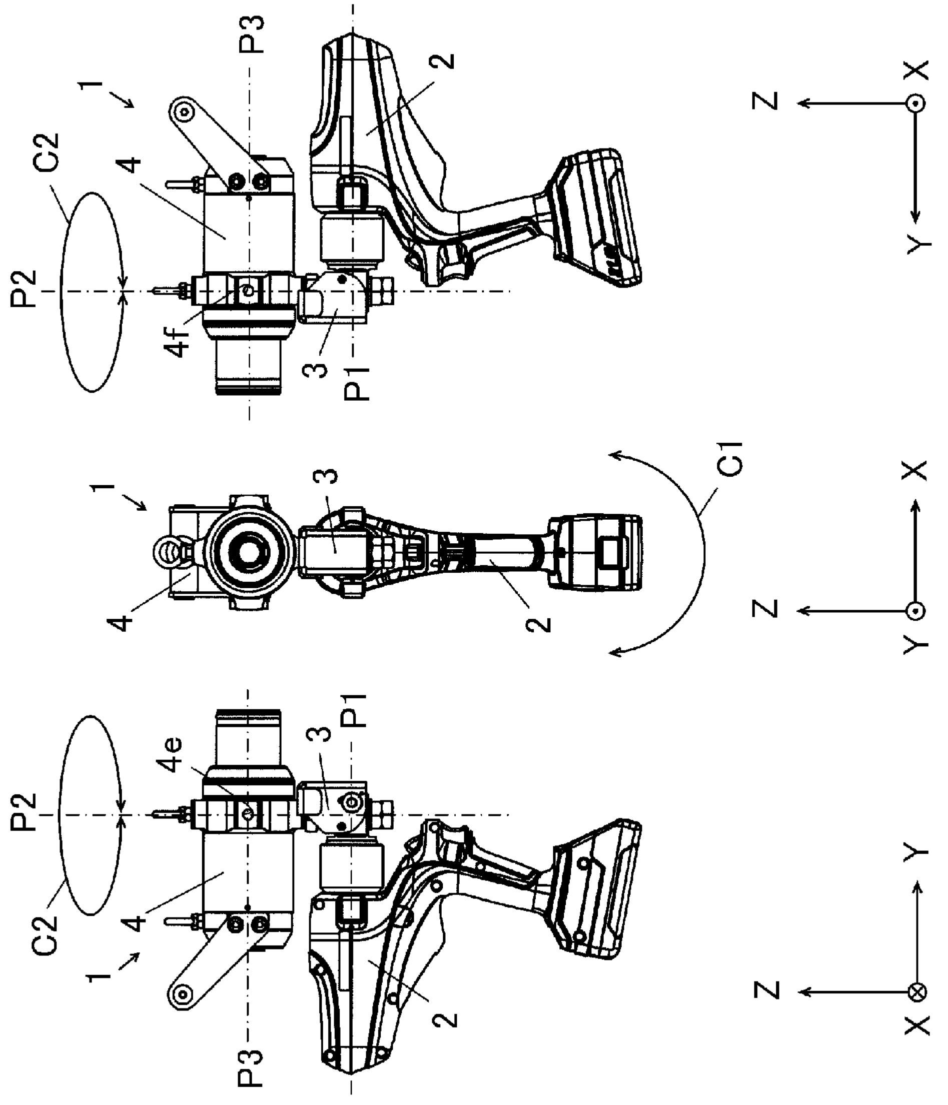
FIG. 4A is a schematic left side view of the electric tool illustrated in FIG. 1.
FIG. 4B is a schematic front view of the electric tool illustrated in FIG. 1.
FIG. 4C is a schematic right side view of the electric tool illustrated in FIG. 1.

FIG. 4A is a schematic left side view of the electric tool 1, FIG. 4B is a schematic front view of the electric tool 1, and FIG. 4C is a schematic right side view of the electric tool 1. The cylinder part 4 is connected to the connecting part 3 to be pivotable by 180 degrees in a C1-direction around the second axis P2 passing through the second joint 12*a*. The main body 2 is connected to the connecting part 3 to be pivotable by 360 degrees in a C2-direction around the first axis P1 passing through the first joint 11*a*. A relative position between the cylinder part 4 and the main body 2 is much more freely adjusted by combining the pivoting of the first joint 11*a* in the C2-direction and the pivoting of the second joint 12*a* in the C1-direction, and thus, operability is further improved.

In examples in FIGS. 1 and 2, the cylinder part 4 is provided with a hanging metal fitting 29*a* and a hanging metal fitting 29*b* which are disposed at a predetermined interval at predetermined positions in a direction opposite to the connecting part 3. Both the hanging metal fitting 29*a* and the hanging metal fitting 29*b* are disposed on an upper surface side of the cylinder part 4 to attach the fall prevention rope. In this manner, when an operation is performed by attaching the fall prevention rope to the hanging metal fitting, the center of gravity is satisfactorily balanced when the fall prevention rope is hung. Therefore, a configuration can be adopted in view of safety in an operation outdoors or at a high place. As an example, the hanging metal fitting 29*a* and the hanging metal fitting 29*b* are eyebolts or eyenuts.

As an example, in the cylinder part 4, a screw hole 4*e* that can attach a rod-shaped handle is disposed on a left side surface, and a screw hole 4*f* that can attach a rod-shaped handle is disposed on a right side surface. In this manner, for example, when an operator having a small hand performs an operation, the rod-shaped handle is attached according to a dominant hand so that the operator can perform the operation by holding the handle in the cylinder part 4. Therefore, a user-friendly configuration can be adopted regardless of a physique of the operator. In the examples in FIGS. 1 and 2, when the second axis P2 is set in the Z-direction and the cylinder part 4 is oriented upward, the first handle 21 is provided directly below the center of gravity, and the second handle 22 is provided at a position separated from the center of gravity. The hanging metal fitting 29*a* is disposed at a position in front of the first handle 21, and the hanging metal fitting 29*b* is disposed at a position behind the first handle 21. In addition, the hanging metal fitting 29*a* is disposed at a position in front of the hydraulic pump 7*a*, and the hanging metal fitting 29*b* is disposed in a position behind the hydraulic pump 7*a*. According to this configuration, when the cylinder part 4 is held by the second handle 22 while the main body 2 is held by the first handle 21, a disposition relationship is maintained to be easily held with both hands. That is, the center of gravity is satisfactorily balanced. Therefore, the operation can be easily performed by holding the first handle 21 and the second handle 22.

Figure 5A:
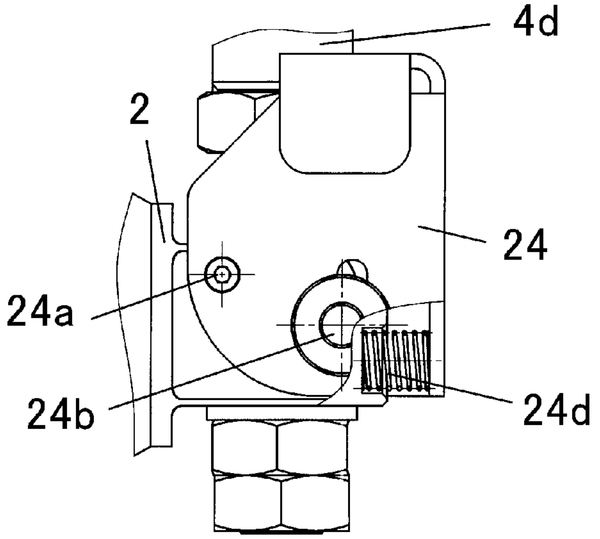
FIG. 5A is a partial sectional view illustrating an example of a clamp part according to the present embodiment.

The present embodiment includes a clamp part 24 that restricts pivoting of the cylinder part 4. The clamp part 24 has a recess portion 24*c* fitted to a projection portion 4*d* protruding downward from the cylinder part 4 through the second axis P2. The recess portion 24*c* has a cutout shape suitable for an outer shape of the projection portion 4*d*. FIG. 5A is a partial sectional view illustrating an example of the pivoting-type clamp part 24. The clamp part 24 has a square frame shape that matches an outer shape of the connecting part 3, and is connected to the cylinder part 4 to be fittable in a state of being supported by a shaft 24*a* passing through the connecting part 3 in an X-direction. In an example in FIG. 5A, the clamp part 24 is unlocked by pivoting downward with respect to the shaft 24*a*, and the cylinder part 4 is moved so that the clamp part 24 pivots upward by a restoring force of a spring 24*d*. In this manner, the pivoting of the cylinder part 4 can be locked at a specified angle such as 45 degrees or 90 degrees.

Figure 5B:
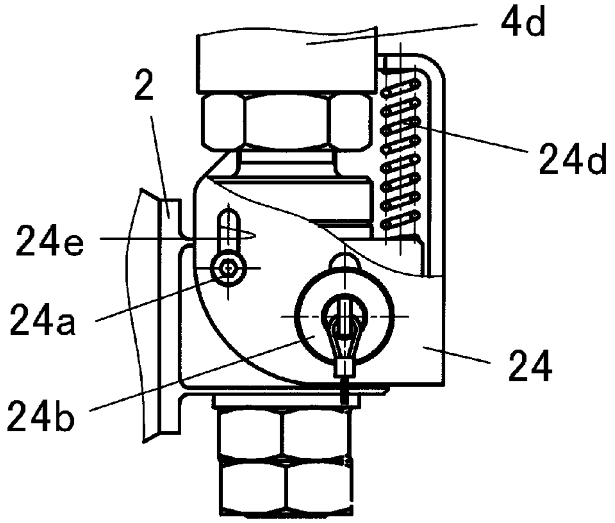
FIG. 5B is a partial sectional view illustrating another example of the clamp part according to the present embodiment.

FIG. 5B is a partial sectional view illustrating an example of a slidable clamp part. The clamp part 24 has a square frame shape that matches an outer shape of the connecting part 3, and is connected to the cylinder part 4 to be fittable in a state of being supported by the shaft 24*a* passing through the connecting part 3 in the X-direction. In an example in FIG. 5B, the clamp part 24 is unlocked by sliding downward along a guide hole 24*e* with respect to the shaft 24*a*, and the cylinder part 4 is moved so that the clamp part 24 is slid upward by the restoring force of the spring 24*d*. In this manner, the pivoting of the cylinder part 4 can be locked at a specified angle such as 45 degrees or 90 degrees.

Figure 6A:
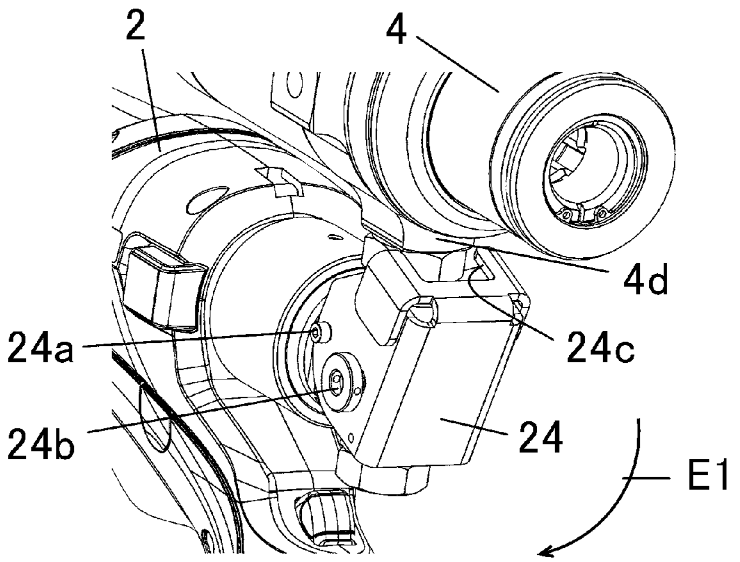
FIG. 6A is a schematic partially enlarged view illustrating an unlocked state in an example of the clamp part according to the present embodiment.
Figure 6B:
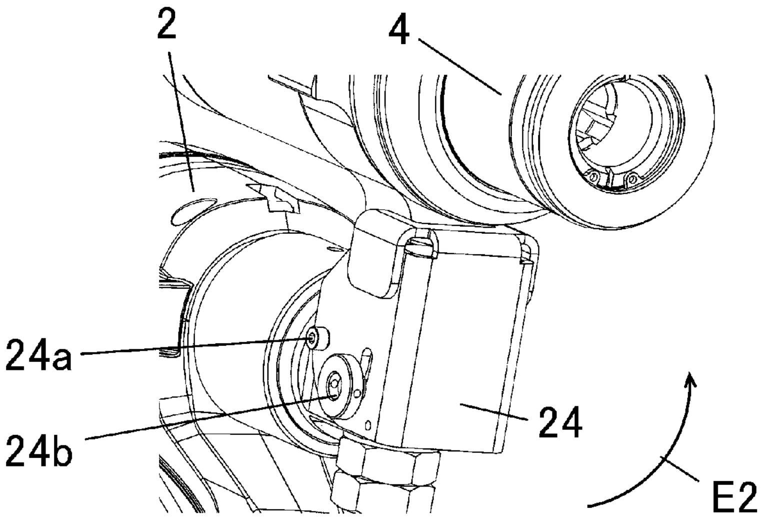
FIG. 6B is a schematic partially enlarged view illustrating a locked state in an example of the clamp part according to the present embodiment.

As an example, as illustrated in FIG. 6A, the clamp part 24 is unlocked by pivoting in an E1-direction to a position where the recess portion 24*c* disengages from the projection portion 4*d*. As illustrated in FIG. 6B, the clamp part 24 is locked when pivoting in an E2-direction to a position where the recess portion 24*c* is fitted to the projection portion 4*d*. The spring 24*d* for maintaining a locked state is incorporated in the clamp part 24. A thumbscrew 24*b* is disposed to release the locked state against a biasing force of the spring 24*d*. As an example, the spring 24*d* is a compression coil spring. According to this configuration, a locking operation can be easily performed even with one hand. While loosening between the cylinder part 4 and the connecting part 3 can be prevented by the locking operation, the cylinder part 4 can pivot by being unlocked. Therefore, operation safety can be further improved.

FIG. 7A is a partial sectional view illustrating an example of the movable connecting part 3, and FIG. 7B is a cross-sectional view of the hydraulic line joint 13. As described above, since the movable connecting part 3 is provided, a relative position between the cylinder part 4 and the main body 2 can be more freely adjusted.

Figure 8:
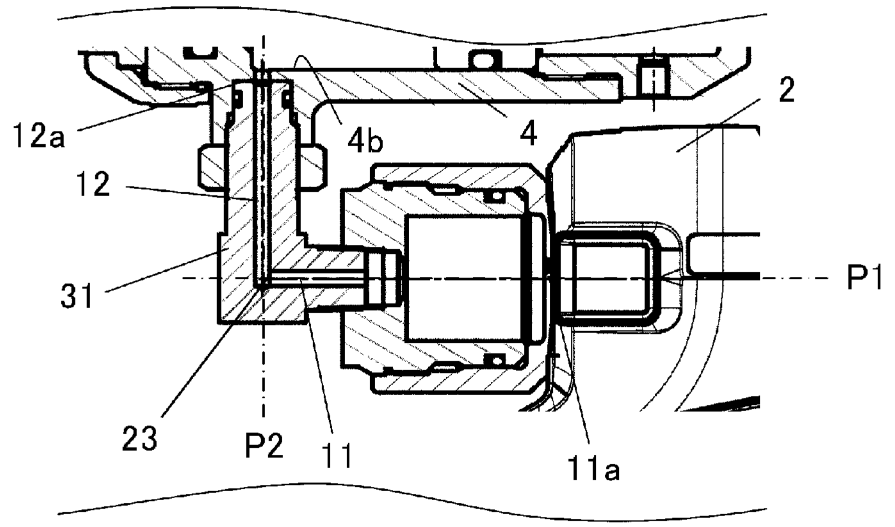
FIG. 8 is a partial sectional view illustrating another example of the connecting part according to the present embodiment.

FIG. 8 is a partial sectional view illustrating an example of a fixed connecting part 31. In a case of the fixed connecting part 31, a hydraulic line joint 23 joins the first hydraulic line 11 and the second hydraulic line 12 which are orthogonal to each other in a simple shape such as a circular shape, and a more compact configuration can be adopted by shortening an interval between the cylinder part 4 and the main body 2.

In the above-described example, a case has been described where the bolt hole alignment pin 55 is pulled to correct a connecting position between the metal member 51 and the metal member 52 when the metal member 51 and the metal member 52 such as structural steel frames are combined. However, the present invention is not limited to this example. The present embodiment is widely applicable to alignment of bolt holes when bridges, scaffoldings, building structures, construction machinery, and other known structural metal members are combined. In addition, in the above-described example, a configuration has been described in which the secondary battery 6 is detachably attached to the main body 2 in a state of the battery pack. However, the present invention is not limited to this example. In some cases, the present embodiment may adopt a configuration in which the secondary battery 6 is incorporated, or both configurations may be combined.

The present invention is not limited to the embodiment described above, and various modifications can be made within the scope not departing from the present invention.

What is claimed is:

1. An electric tool comprising:

a cylinder part in which a chuck for gripping a bolt hole alignment pin and a piston for drawing the bolt hole alignment pin by pulling the chuck are disposed;

a main body in which a hydraulic pump for feeding hydraulic oil for operating the piston to the cylinder part and an electric motor for driving the hydraulic pump are disposed;

a connecting part for connecting the cylinder part and the main body to cause the hydraulic oil to pass; and a secondary battery for supplying electric power to the electric motor.

2. The electric tool according to claim 1, wherein a first hydraulic line and a second hydraulic line through which the hydraulic oil passes are formed in the connecting part, the first hydraulic line is joined to the main body at a first joint, the second hydraulic line is joined to the cylinder part at a second joint, and the first hydraulic line and the second hydraulic line are joined to each other at a hydraulic line joint.

3. The electric tool according to claim 2, wherein the connecting part and the main body are connected to each other to be pivotable around a first axis passing through the first joint.

4. The electric tool according to claim 2, wherein the connecting part and the cylinder part are connected to each other to be pivotable around a second axis passing through the second joint, and the electric tool further comprises a clamp part that aligns the cylinder part and the connecting part by restricting pivoting of the cylinder part and the connecting part.

5. The electric tool according to claim 3, wherein the connecting part and the cylinder part are connected to each other to be pivotable around a second axis passing through the second joint, and the electric tool further comprises a clamp part that aligns the cylinder part and the connecting part by restricting pivoting of the cylinder part and the connecting part.

6. The electric tool according to claim 1, wherein the cylinder part is provided with a first handle disposed in a direction away from the main body.

7. The electric tool according to claim 2, wherein the cylinder part is provided with a first handle disposed in a direction away from the main body.

8. The electric tool according to claim 4, wherein the cylinder part is provided with a first handle disposed in a direction away from the main body.

9. The electric tool according to claim 1, wherein the cylinder part is provided with a hanging metal fitting disposed at a predetermined position in a direction opposite to the connecting part.

10. The electric tool according to claim 2, wherein the cylinder part is provided with a hanging metal fitting disposed at a predetermined position in a direction opposite to the connecting part.

11. The electric tool according to claim 4, wherein the cylinder part is provided with a hanging metal fitting disposed at a predetermined position in a direction opposite to the connecting part.

12. The electric tool according to claim 1, wherein the main body includes an adapter, and the secondary battery is joined to the adapter in a form of a battery pack.

13. The electric tool according to claim 2, wherein the main body includes an adapter, and the secondary battery is joined to the adapter in a form of a battery pack.

14. The electric tool according to claim 3, wherein the main body includes an adapter, and the secondary battery is joined to the adapter in a form of a battery pack.

15. The electric tool according to claim 6, wherein the main body includes an adapter, and the secondary battery is joined to the adapter in a form of a battery pack.

16. The electric tool according to claim 7, wherein the main body includes an adapter, and the secondary battery is joined to the adapter in a form of a battery pack.

17. The electric tool according to claim 8, wherein the main body includes an adapter, and the secondary battery is joined to the adapter in a form of a battery pack.

* * * * *